US012767859B2

(12) United States Patent
Lin et al.

(10) Patent No.: US 12,767,859 B2
(45) **Date of Patent: *Oct. 20, 2026**

(54) GAS-PERMEABLE HOT-MELT SEALING FILM FOR HEALTHCARE PACKAGING

(71) Applicant: BenQ Materials Corporation, Taoyuan City (TW)

(72) Inventors: Yen-Ling Lin, Taoyuan City (TW); Ching-Huang Chen, Taoyuan City (TW); Kuo-Hsuan Yu, Taoyuan City (TW)

(73) Assignee: BenQ Materials Corporation, Taoyuan City (TW)

( * ) Notice: Subject to any disclaimer, the term of this patent is extended or adjusted under 35 U.S.C. 154(b) by 77 days.

This patent is subject to a terminal disclaimer.

(21) Appl. No.: 18/796,321

(22) Filed: Aug. 7, 2024

(65) Prior Publication Data

US 2025/0154382 A1 May 15, 2025

(30) Foreign Application Priority Data

Nov. 9, 2023 (TW) ................................ 112143276

(51) Int. Cl.

| | |
|---|---|
| ***C09J 7/35*** | (2018.01) |
| ***A61J 1/03*** | (2023.01) |
| ***B65D 75/36*** | (2006.01) |
| ***C09J 7/21*** | (2018.01) |
| ***C09J 11/08*** | (2006.01) |
| ***D04H 1/4291*** | (2012.01) |
| ***D04H 1/56*** | (2006.01) |
| ***D06N 3/00*** | (2006.01) |
| ***D06N 3/04*** | (2006.01) |
| ***D06N 3/12*** | (2006.01) |

(52) U.S. Cl.

CPC ................. *C09J 7/35* (2018.01); *A61J 1/035* (2013.01); *B65D 75/36* (2013.01); *C09J 7/21* (2018.01); *C09J 11/08* (2013.01); *D04H 1/4291* (2013.01); *D04H 1/56* (2013.01); *D06N 3/0011* (2013.01); *D06N 3/0038* (2013.01); *D06N 3/0061* (2013.01); *D06N 3/0088* (2013.01); *D06N 3/045* (2013.01); *D06N 3/128* (2013.01); *C09J 2301/304* (2020.08); *D06N 2201/0254* (2013.01); *D06N 2209/106* (2013.01); *D06N 2209/16* (2013.01); *D06N 2211/00* (2013.01); *D10B 2321/021* (2013.01); *D10B 2505/10* (2013.01); *D10B 2509/00* (2013.01)

(58) Field of Classification Search

CPC .. A61J 1/035; B65D 75/36; C08K 7/00; C09J 11/08; C09J 2301/18; C09J 2301/304; C09J 2301/408; C09J 2400/263; C09J 2423/006; C09J 2491/00; C09J 7/21; C09J 7/30; C09J 7/35; D04H 1/4291; D04H 1/56; D06N 2201/0254; D06N 2209/106; D06N 2209/16; D06N 2211/00; D06N 3/0011; D06N 3/0038; D06N 3/0061; D06N 3/0088; D06N 3/045; D06N 3/128; D10B 2321/021; D10B 2505/10; D10B 2509/00

See application file for complete search history.

(56) References Cited

U.S. PATENT DOCUMENTS

| | | | | |
|---|---|---|---|---|
| 3,859,385 | A | 1/1975 | Mainord | |
| 2006/0105126 | A1* | 5/2006 | Kendig | B32B 27/30 428/35.2 |
| 2024/0360628 | A1* | 10/2024 | Wakabayashi | C09J 7/21 |
| 2025/0154383 | A1* | 5/2025 | Chen | C09J 123/06 |

FOREIGN PATENT DOCUMENTS

| | | | |
|---|---|---|---|
| CN | 1918257 | A | 2/2007 |
| CN | 103214983 | A | 7/2013 |
| CN | 108251016 | A | 7/2018 |
| CN | 108441149 | A | 8/2018 |
| CN | 108774481 | A | 11/2018 |
| CN | 112639041 | A | 4/2021 |
| CN | 114045144 | A | 2/2022 |
| CN | 115637122 | A | 1/2023 |
| CN | 116333656 | A | 6/2023 |
| CN | 116410678 | A | 7/2023 |
| CN | 116875239 | A | 10/2023 |
| WO | 2007008558 | A2 | 1/2007 |

OTHER PUBLICATIONS

Translation of CN 108441149, Yang Li, Aug. 24, 2018 (Year: 2018).*

Translation of CN 114045144, Bo-quan Li, Feb. 15, 2022 (Year: 2022).*

* cited by examiner

*Primary Examiner* — Hai Vo

(74) *Attorney, Agent, or Firm* — CKC & Partners Co., LLC

(57) ABSTRACT

The present disclosure is to provide a gas permeable hot-melt sealing film for healthcare packaging. The gas permeable hot-melt sealing film includes an polyolefin spunbonded nonwoven fabric substrate; and a water-based hot-melt adhesive coating layer coated on the substrate including voids, wherein the coating amount of the water-based hot-melt adhesive is in the range of 6 g/m$^2$ to 35 g/m$^2$ and the surface void ratio thereof is in the range 0.5% to 6.0%. The gas permeable hot-melt sealing coating film of the present disclosure has sufficient gas permeability, and satisfied seal strength and peelability after sealing around with flexible sheet or blister container.

13 Claims, 2 Drawing Sheets

100

100

100

100

GAS-PERMEABLE HOT-MELT SEALING FILM FOR HEALTHCARE PACKAGING

CROSS-REFERENCE TO RELATED APPLICATION

This application claims the benefit of Taiwanese patent application serial No. 112143276, filed on Nov. 9, 2023, the subject matter of which is incorporated herein by reference.

BACKGROUND OF THE INVENTION

Field of the Invention

This disclosure relates to a gas-permeable hot-melt sealing film for healthcare packaging and particularly, relates to a hot-melt sealing film with satisfied gas permeability. The disclosed hot-melt sealing film for medical device packaging provides satisfied gas permeability and seal strength.

Background of the Invention

Healthcare devices need to be packaged in a sealed manner and sterilized after packaging. Therefore, the packaging material has to be a microbial barrier to keep the medical device in a sterilized environment after sterilization and before use. The sterilization for the packaged medical devices commonly are steam sterilization, ethylene oxide (EO) gas sterilization, electron beam sterilization, plasma sterilization or gamma radiation sterilization. Since the steam and EO gas during the process of the steam sterilization and EO gas sterilization need to be introduced into the packages for sterilizing the medical devices, the packaging has to be made of material having gas-permeability. In the existing art, the common materials which provide good microbial barrier effect and gas-permeability are medical paper or breathable polyethylene non-woven fabrics made by melt-blown method, such as Tyvek® produced by DuPont, US.

The medical gas-permeable materials, such as medical paper or breathable polyethylene films, are usually coated with heat-sealing adhesives layer to facilitate heat-sealing with various flexible sheets or plastic packaging trays. In addition to gas-permeability, the medical packaging material is required to have sufficient heat seal strength and peelability. The insufficient heat seal strength of the material will cause the poor sealing of medical device packaging, which may result in the packaging broken due to high gas pressure in the sterilization. Also, excessive heat seal strength may make the packaging difficult to peel open or result in the occurrence of fiber tear to contaminate the healthcare devices when peeling open the package.

SUMMARY OF THE INVENTION

The present disclosure is to provide a gas-permeable hot-melt sealing film for healthcare packaging, which provides satisfied gas-permeability for steam sterilization or ethylene oxide (EO) sterilization process and provides reliable seal strength and peelability after being heat sealed with a flexible sheet material or a blister container at the peripheral edges.

The present gas-permeable hot-melt sealing film includes a polyolefin spunbonded nonwoven fabric substrate; and a water-based hot-melt adhesive coating layer coated on the substrate and including a plurality of voids, wherein the coating amount of the water-based hot-melt adhesive coating layer is between 6 $g/m^2$ to 35 $g/m^2$ and the surface void ratio thereof is between 0.5% to 6.0%.

The gas permeability of the present gas-permeable hot-melt sealing film is less than 120 second/100 cc (TAPPI T-460) and the seal strength thereof is more than 220 g/15 mm (ASTM F-88).

In the disclosed gas-permeable hot-melt sealing film, the average size of the plurality of voids on the water-based hot-melt adhesive coating layer is between 2 $m^2$ to 150 $\mu m^2$.

In the disclosed gas-permeable hot-melt sealing film, the ratio (P/W) of the surface void ratio (P) and the coating amount (W) of the water-based hot-melt adhesive coating layer is between 0.03 to 0.50.

In the disclosed gas-permeable hot-melt sealing film, the water-based hot-melt adhesive coating layer includes 40 wt % to 75 wt % water-based adhesive resin, 15 wt % to 35 wt % of wax particles and 15 wt % to 35 wt % of tackifier particles, wherein the total amount of the wax particles and the tackifier particles is 30 wt % to 60 wt % of the total weight of the water-based hot-melt adhesive coating layer.

In the disclosed gas-permeable hot-melt sealing film, the weight ratio of the wax particles and the tackifier particles in the water-based hot-melt adhesive coating layer is between 0.6:1 to 1.5:1.

In the disclosed gas-permeable hot-melt sealing film, the particle size of the wax particles and the tackifier particles in the water-based hot-melt adhesive coating layer is between 3 μm to 35 μm.

In the disclosed gas-permeable hot-melt sealing film, the water-based adhesive resin includes one or more water-based polyolefin resin. The water-based polyolefin resin can be, for example, water-based polyethylene resin, water-based polypropylene resin, water-based polybutylene resin, water-based oxidized polyethylene resin, water-based ethylene-(meth) acrylic acid copolymer or the combinations thereof.

In the disclosed gas-permeable hot-melt sealing film, the water-based adhesive resin further includes a water-based ionomer. The water-based ionomer can be, for example, water-based polyethylene ionomer, water-based polypropylene ionomer, water-based polybutylene ionomer, water-based oxidized polyethylene ionomer or the combinations thereof. The water-based ionomer is present in an amount of 2 wt % to 20 wt % based on the total weight of the water-based adhesive resin.

In the disclosed gas-permeable hot-melt sealing film, the water-based hot-melt adhesive coating layer optionally includes 1 wt % to 10 wt % of water-based paraffin.

In the disclosed gas-permeable hot-melt sealing film, the surface roughness of the water-based hot-melt adhesive coating layer has a root mean square height (Sq) from 3.0 μm to 11 μm, a maximum height (Sz) from 30 μm to 100 μm, an arithmetical mean height (Sa) from 2.5 μm to 6.5 μm, a root mean square slope (SΔq) from 1.00 to 3.80 and a developed interfacial area ratio (Sdr) from 30% to 110%.

The another aspect of the present disclosure is to provide a healthcare packaging including the disclosed gas-permeable hot-melt sealing film sealed with a polymer sheet or a polymer blister container.

In an embodiment of the disclosed healthcare packaging, the polymer sheet or polymer blister container is made of PET (polyethylene terephthalate), PETG (polyethylene terephthalateco-1,4-cylclohexylenedimethylene terephthalate), PVC (polyvinyl chloride), APET (amorphous polyethylene terephthalate), PS (polystyrene), PP (polypropylene), PC (polycarbonate), PE (polyethylene) or nylon.

In an embodiment of the disclosed healthcare packaging, the heat seal strength of the gas-permeable hot-melt sealing film with the polymer sheet or the polymer blister container is between 250 g/15 mm to 450 g/15 mm.

The above and other aspects of the disclosure will become better understood with regard to the following detailed description of the preferred but non-limiting embodiment(s). These and other aspects of the disclosure will become apparent from the following description of the presently preferred embodiments. The detailed description is merely illustrative of the disclosure and does not limit the scope of the disclosure, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

Figure 1:
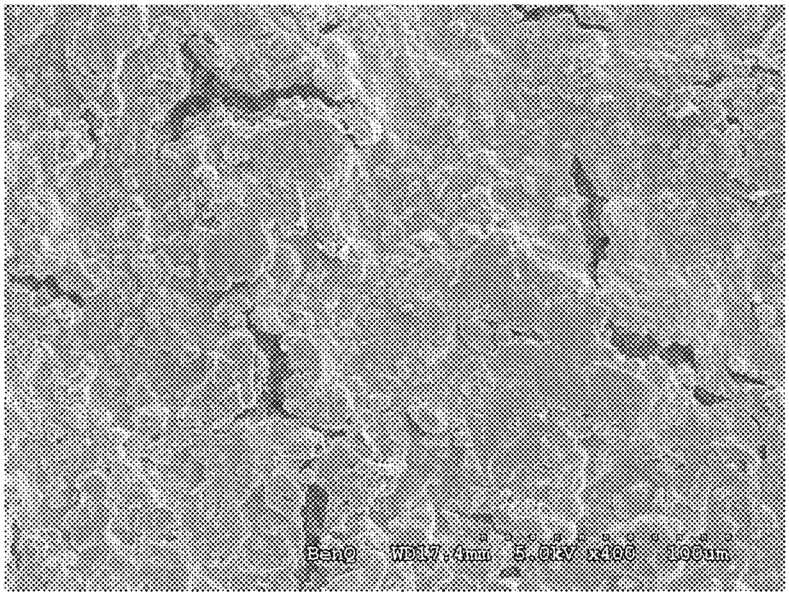
FIG. 1 is the scanning electron microscope image of the surface of the present gas-permeable hot-melt sealing film obtained from Example 4 at 400 magnifications.

In the following detailed description, for purposes of explanation, numerous specific details are set forth in order to provide a thorough understanding of the disclosed embodiments. It will be apparent, however, that one or more embodiments may be practiced without these specific details.

It is apparent that departures from specific designs and methods described and shown will suggest themselves to those skilled in the art and may be used without departing from the spirit and scope of the disclosure. The present disclosure is not restricted to the particular constructions described and illustrated, but should be construed to cohere with all modifications that may fall within the scope of the appended claims.

Unless defined otherwise, all technical and scientific terms used herein have the same meaning as commonly understood by one of ordinary skill in the art to which this disclosure belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

As used herein, the "gas permeability" refers to the air resistance of gas passing through a gas-permeable sheet material. According to the TAPPI T-460, it measures the time required for 100 cubic centimeters (cc) of air passing through a 1 inch square of sample at a pressure difference of approximately 1.22 kPa.

As used herein, the "seal strength" refers to the peel strength required to separate two sealed flexible sheet material, the strength is measured according to ASTM F88 in a "T-peel" configuration at an elongation speed of 200 mm/min.

As used herein, the "surface void ratio (%)" refers to the surface void ratio (%) of the water-based hot-melt adhesive coating layer of the gas-permeable hot-melt sealing film. It is measured by cutting the gas-permeable hot-melt sealing film into an appropriate size and adhered on a carrier stage, electroplating the sample with platinum, placing the carrier stage in Hitachi S-4300 Cold Field Emission Scanning Electron Microscope (CFE-SEM), taking the image of sample under 60 magnifications to obtain an image with 1280×960 pixels (2133 μm in length and 1600 μm in width). The obtained image is analyzed by ImageJ (developed by the National Institutes of Health, NIH) to select the void area via the different shade of image color and calculate the total area of voids. The percentage of the total area of the voids to the overall area of the image is further calculated to obtain the surface void ratio (%).

As used herein, the "coating amount" refers to the weight of the water-based hot-melt adhesive coating layer coated on per unit of the substrate (g/m$^2$).

The disclosed gas-permeable hot-melt sealing film provides satisfied gas-permeability for steam sterilization or ethylene oxide (EO) sterilization process after heat sealing with the peripheral edges of a flexible sheet material or a blister container for forming a healthcare packaging which can meet the sterilization requirements to the content in the healthcare packaging. Moreover, when peeling open the sealed healthcare packaging, no fiber tear occurs to contaminate the content of the healthcare packaging. The disclosed gas-permeable hot-melt sealing film includes a polyolefin spunbonded nonwoven fabric substrate; and a water-based hot-melt adhesive coating layer coated on the substrate and including a plurality of voids, wherein the coating amount of the water-based hot-melt adhesive coating layer is between 6 g/m$^2$ to 35 g/m$^2$ and the surface void ratio is between 0.5% to 6.0%.

The water-based hot-melt adhesive coating layer of the disclosed gas-permeable hot-melt sealing film includes a high amount of particles to impart appropriate voids to the coating layer and to provide desired seal strength and adhesion to the nonwoven fabric substrate. The gas permeability of the disclosed gas-permeable hot-melt sealing film is less than 120 second/100 cc (TAPPI T-460) and preferably is less than 100 second/100 cc, and the seal strength thereof is more than 220 g/15 mm (ASTM F-88) and preferably more than 250 g/15 mm.

The average size of the plurality of voids on the water-based hot-melt adhesive coating layer of the disclosed gas-permeable hot-melt sealing film is between 2 m$^2$ to 150 μm$^2$.

The coating amount (W) of the water-based hot-melt adhesive coating layer on the disclosed gas-permeable hot-melt sealing film is preferably between 6 g/m$^2$ to 35 g/m$^2$, and the ratio (P/W) of the surface void ratio (P) and the coating amount (W) of the water-based hot-melt adhesive coating layer is between 0.03 to 0.50.

The suitable polyolefin spunbonded nonwoven fabric substrate for the disclosed gas-permeable hot-melt sealing film can be the nonwoven fabric commonly used in the healthcare packaging, DuPont Tyvek® with a basis weight of 40 g/m$^2$ to 80 g/m$^2$, such as Tyvek® 1073B, Tyvek® 1059B, Tyvek® 2FS and the like, but not limited thereto.

In the disclosed gas-permeable hot-melt sealing film, the water-based hot-melt adhesive coating layer includes 40 wt % to 75 wt % water-based adhesive resin, 15 wt % to 35 wt % of wax particles and 15 wt % to 35 wt % of tackifier particles, wherein the total amount of the wax particles and the tackifier particle is 30 wt % to 60 wt % of the total weight of the water-based hot-melt adhesive coating layer.

In an embodiment of the disclosed gas-permeable hot-melt sealing film, the weight ratio of the wax particles and the tackifier particles in the water-based hot-melt adhesive coating layer is between 0.6:1 to 1.5:1.

In an embodiment of the disclosed gas-permeable hot-melt sealing film, the particle size of the wax particles and the tackifier particles in the water-based hot-melt adhesive coating layer is between 3 μm to 35 μm, and preferably is between 3 μm to 30 m.

The water-based hot-melt adhesive coating layer of the disclosed gas-permeable hot-melt sealing film includes particles to provide appropriate voids to the coating layer to achieve the gas-permeability but not to affect the stability of the coating layer. When the gas-permeable hot-melt sealing film is heat sealed with a flexible sheet or a blister container for packaging a medical device, if the surface roughness of the water-based hot-melt adhesive coating layer of the gas-permeable hot-melt sealing film is too high, the water-based hot-melt adhesive coating layer may fall off to contaminate the healthcare device due to the healthcare device's movement in the package.

In an embodiment of the disclosed gas-permeable hot-melt sealing film, the surface roughness of the water-based hot-melt adhesive coating layer has a root mean square height (Sq) from 3.0 μm to 11 μm, a maximum height (Sz) from 30 μm to 100 μm, an arithmetical mean height (Sa) from 2.5 μm to 6.5 μm, a root mean square slope (SΔq) from 1.00 to 3.80 and a developed interfacial area ratio (Sdr) from 30% to 110%. In a preferred embodiment of the disclosed gas-permeable hot-melt sealing film, the surface roughness of the water-based hot-melt adhesive coating layer has a root mean square height (Sq) from 4.0 μm to 11 μm, a maximum height (Sz) from 35 μm to 100 μm, an arithmetical mean height (Sa) from 3.0 μm to 6.5 μm, a root mean square slope (SΔq) from 1.30 to 3.80 and a developed interfacial area ratio (Sdr) from 40% to 110%.

Moreover, the present gas-permeable hot-melt sealing film provides sufficient sealing strength and peelability as being thermal sealed with a flexible material sheet or a blister container at the peripheral edges thereof for manufacturing a healthcare packaging. When peeling open the packaging, the present gas-permeable hot-melt sealing film and the flexible material sheet or the blister container are peeled apart at the sealed area with splitting the adhesive coating layer of the hot-melt sealing film to keep the stable heat-seal and reduce the occurrence of fiber tear to contaminate the healthcare device in the packaging.

The water-based adhesive resin in the water-based hot-melt adhesive coating layer of the disclosed gas-permeable hot-melt sealing film can include but not limit to water-based polyolefin resin. The suitable water-based polyolefin resin can be hydrophilic modified water-based polyolefin resin, Suitable water-based polyolefin resin can be water-based polyethylene resin, water-based polypropylene resin, water-based polybutylene resin, water-based oxidized polyethylene resin, water-based ethylene-(meth)acrylic acid copolymer or the combinations thereof, but not limited thereto. The water-based hot-melt adhesive coating layer can use one or more water-based polyolefin resin.

Suitable water-based polyolefin resin of the disclosed hot melt adhesive can be commercial products, such as, for example, ALTRIX WPE-09838 from Kelly Chemicals Co., Taiwan; Arrowbase SB-1030N from Unitika Ltd. Japan; HME-118-B from MICA Corp., US, but not limited thereto.

In an embodiment of the present disclosure, the water-based adhesive resin can optionally further include a water-based ionomer, for example but not limit to, water-based polyethylene ionomer, water-based polypropylene ionomer, water-based polybutylene ionomer, water-based oxidized polyethylene ionomer or the combinations thereof. Suitable water-based ionomer of the disclosed hot melt adhesive can be commercial products, such as, for example, Chemipearl™ S300, S500 from Mitsui Chemicals Inc., Japan. The water-based ionomer is present in an amount of 2 wt % to 20 wt % based on the total weight of the water-based adhesive resin.

The wax particles in the water-based hot-melt adhesive coating layer can decrease the melt viscosity and surface tackiness of the hot-melt adhesive coating layer but not significantly decreasing the adhesion thereof. The present water-based hot-melt adhesive coating layer includes 15 wt % to 35 wt % of wax particles, and preferably is between 15 wt % to 30 wt %. Furthermore, for enhancing the gas-permeability of the disclosed water-based hot-melt adhesive coating layer on the polyolefin spunbonded nonwoven fabric substrate, the particle size (D50) of the wax particles can be in the range of 3 μm to 35 μm, preferably is in the range of 3 μm to 30 μm, and more preferably is in the range of 5 μm to 20 μm.

The suitable wax particles can be commercially obtained, such as Fischer-Tropsch synthetic wax, polypropylene micronized wax, polyethylene micronized wax, oxidized polyethylene wax powder, microcrystalline wax or the combinations thereof, but not limited thereto. The suitable Fischer-Tropsch synthetic wax can be, for example, Sasolwax Spray 30-G, Spray 30G-M, Spray 30G-EF, Spray 105, Spray 105-G, Spray 105G-EF, Sasolwax Aqua 30-G and Aqua 30G-EF, commercially obtained from Sasol Ltd., South Africa. The suitable polypropylene micronized wax can be, such as, CERAFLOUR® 913 and CERAFLOUR® 914 commercially obtained from BYK-Chemie GmbH, Germany, or CERETAN® MP2120 commercially obtained from Munzing Chemie GmbH, Germany. The suitable polyethylene micronized wax can be, such as, CERAFLOUR® 925, CERAFLOUR® 929N commercially obtained from BYK-Chemie GmbH, Germany, CERETAN® MO4715 commercially obtained from Munzing Chemie GmbH, Germany.

The disclosed water-based hot-melt adhesive coating layer uses tackifier particles to raise the total amount of the particles in the layer for increasing the interstices in the water-based hot-melt adhesive coating layer but still maintain the desired seal strength and adhesion to the nonwoven fabric substrate. The present water-based hot-melt adhesive coating layer includes 15 wt % to 35 wt % of tackifier particles and preferably includes 15 wt % to 30 wt % of tackifier particles.

For providing satisfied gas-permeability and seal strength to the water-based hot-melt adhesive coating layer, the particle size (D50) of the tackifier particles in the coating layer is similar to the particle size (D50) of the wax particles and can be from 3 μm to 35 μm and preferably from 5 μm to 30 μm. In the water-based hot-melt adhesive coating layer, the amount of the tackifier particles can be adjusted in dependent to the amount of wax particles to make up the total amount of particles, that is, the total amount of the tackifier particles and the wax particles, to be 30 wt % to 60 wt % of the water-based hot-melt adhesive coating layer, and preferably be 45 wt % to 60 wt %. In the water-based hot-melt adhesive coating layer, as the amount of wax particles can affect the seal strength of the adhesive layer, the weight ratio of the wax particles to the tackifier particles is between 0.6:1 to 1.5:1, and preferably is between 0.8:1 to 1.2:1.

The tackifier particles suitably used in the disclosed water-based hot-melt adhesive coating layer can be petroleum resin micropowders or hydrogenated petroleum resin micropowders, for example, C5 petroleum resin micropowders, C9 petroleum resin micropowders, C5/C9 copolymerized petroleum resin micropowders, hydrogenated C9 petroleum resin micropowders or the combination thereof, for example, the commercial products, Wingtack® 95, Wingtack® 98, Wingtack® STS, Wingtack® Extra, Cleartack® W-90, Cleartack® W-110, Cleartack® W-120 and Cleartack® W-140 sold by Cray Valley Ltd., US; the commercial products, Regalite™ R1090 and Regalite™ R1125 sold by Synthomer Co., UK; the commercial products, YL-90 and YL-120H sold by Yuen Liang Ind. & Co., Ltd., Taiwan, but not limited thereto.

In an embodiment of the present disclosure, the water-based hot-melt adhesive coating layer can optionally further include a water-based paraffin to enhance the peelability of the disclosed gas-permeable hot-melt sealing film in order to eliminate contamination possibility resulted from the fiber tear as peeling apart the sealing film from the healthcare packaging. The water-based paraffin can be present in an amount of 1 wt % to 10 wt % based on the total weight of the water-based hot-melt coating layer.

The water-based hot-melt adhesive coating layer of the disclosed gas-permeable hot-melt sealing film can further include additives, such as wetting dispersing agents, defoaming agents, and thickeners to enhance the coating processability of the water-based hot melt adhesive; anti-oxidants, UV stabilizers, antibacterial agents, antistatic agents to increase the functionality of water-based hot melt adhesives. The types and amounts of the additives can be properly selected by person skilled in the related art in accordance with the practical requirements of the hot-melt sealing film. The water-based hot-melt adhesive coating layer of the gas-permeable hot-melt sealing film can be coated by the coating processes commonly used in this technical field, for example, roll coating process, blade coating process, roller coating process, spin coating process, spray coating process, slot-die coating process or air knife coating process, but not limited to this.

The present disclosure is further to provide a healthcare packaging including the disclosed gas-permeable hot-melt sealing film sealed with a polymer sheet or a polymer blister container. The suitable polymer sheet or a polymer blister container used to be sealed with the disclosed gas-permeable hot-melt sealing film can be made from, for example, PET (polyethylene terephthalate), PETG (polyethylene terephthalateco-1,4-cylclohexylenedimethylene terephthalate), PVC (polyvinyl chloride), APET (amorphous polyethylene terephthalate), PS (polystyrene), PP (polypropylene), PC (polycarbonate), PE (polyethylene), nylon, but not limited thereto.

The disclosed gas-permeable hot-melt sealing film can be heat sealed with a packaging material as described above, at the temperature of 90° C. to 150° C., the seal strength of the sealed packaging is more than 220 g/15 mm and preferably, is more than 250 g/15 mm.

The present disclosure will be explained in further detail with reference to the examples. However, the present disclosure is not limited to these examples.

EXAMPLE

The materials used in the Example were as below:

- WPE-09838: polyethylene emulsion, melting point 145° C., glass transition temperature (Tg) −120° C., solid content 25%, solvent: water, commercially obtained from Kelly Chemicals Co., Taiwan;
- Chemipearl™ S500: polyolefin ionomer aqueous dispersion, solid content 42%, solvent: water, commercially obtained from Mitsui Chemicals Inc., Japan;
- Chemipearl™ S300: Polyolefin ionomer aqueous dispersion, solid content 35%, solvent: water, commercially obtained from Mitsui Chemicals Inc., Japan;
- AQUACER 497: paraffin-based wax emulsion, solid content 50%, solvent: water, melting point 60° C., commercially obtained from BYK-Chemie GmbH, Germany;
- Sasolwax Spray 30G-M: Fischer-Tropsch fine micronized wax powder, melting point 96° C. to 100° C., glass transition temperature (Tg) about −120° C., average particle size 9 to 11 μm, commercially obtained from Sasol Limited, South Africa;
- Cleartack® W-140: C9 petroleum resin, soft point 140° C., glass transition temperature (Tg) 90° C., number-average molecular weights (Mn) 1200 g/mol, average particle size 5 μm to 10 μm, commercially obtained from Cray Valley Ltd, US;
- BYK-3450: polyether-modified siloxane-based surfactant, commercially obtained from BYK-Chemie GmbH, Germany;
- BYK-025: silicone-based defoamer, solid content 18.5%, solvent: dipropylene glycol monomethyl ether, commercially obtained from BYK-Chemie GmbH, Germany;
- Rheovis®AS 1125: acrylic thickener, solid content 25%, solvent: water, commercially obtained from BASF SE, Germany;
- Tyvek® 2FS: high density polyethylene spunbonded non-woven fabric substrate, commercially obtained from DuPont de Nemours, Inc., US.

Example 1

100 weight parts of polyethylene emulsion (WPE-09838), 12.6 weight parts of Fischer-Tropsch wax (Sasolwax Spray 30G-M), 12.6 weight parts of C9 petroleum resin (Cleartack® W-140), 0.2 weight parts of polyether-modified siloxane-based surfactant (BYK-3450), 0.13 weight parts of silicone-based defoamer (BYK-025), 4.8 weight parts of acrylic thickener (Rheovis® AS 1125) and 127.5 weight parts of deionized water were mixed and stirred for 1 hour for evenly dispersion to prepare a water-based hot-melt adhesive solution.

The obtained hot-melt adhesive solution was coated on Tyvek® 2FS polyethylene spunbonded nonwoven fabric substrate by roller coating and dried at 80° C. to form a hot melt-adhesive coating with a coating weight of 9.6 $g/m^2$ on Tyvek® 2FS substrate to prepare a gas-permeable hot-melt sealing film.

The gas permeability, surface void ratio, heat seal strength, surface roughness and layer-peeling of the obtained gas-permeable hot-melt sealing film were evaluated by the evaluation methods described hereinafter. The results were shown in Table 1.

Example 2

The water-based hot melt adhesive solution obtained from Example 1 was coated on Tyvek® 2FS substrate and dried at 80° C. to form a hot melt adhesive coating with a coating weight of 22.6 g/m$^2$ on Tyvek® 2FS substrate to prepare a gas-permeable hot-melt sealing film.

The gas permeability, surface void ratio, heat seal strength, surface roughness and layer-peeling of the obtained gas-permeable hot-melt sealing film were evaluated by the evaluation methods described hereinafter. The results were shown in Table 1.

Example 3

100 weight parts of polyethylene emulsion (WPE-09838), 12.6 weight parts of Fischer-Tropsch wax (Sasolwax Spray 30G-M), 12.6 weight parts of C9 petroleum resin (Cleartack® W-140), 0.2 weight parts of polyether-modified siloxane-based surfactant (BYK-3450), 0.13 weight parts of silicone-based defoamer (BYK-025), 6.0 weight parts of acrylic thickener (Rheovis® AS 1125) and 127.5 weight parts of deionized water were mixed and stirred for 1 hour for evenly dispersion to prepare a water-based hot melt adhesive solution.

The obtained hot melt adhesive solution was coated on Tyvek® 2FS polyethylene spunbonded nonwoven fabric substrate by roller coating and dried at 80° C. to form a hot melt adhesive coating with a coating weight of 13.3 g/m$^2$ on Tyvek® 2FS substrate to prepare a gas-permeable hot-melt sealing film.

The gas permeability, surface void ratio, heat seal strength, surface roughness and layer-peeling of the obtained gas-permeable hot-melt sealing film were evaluated by the evaluation methods described hereinafter. The results were shown in Table 1.

Example 4

100 weight parts of polyethylene emulsion (WPE-09838), 1.7 weight parts of polyethylene emulsion (AQUACER 497), 9.1 weight parts of Fischer-Tropsch wax (Sasolwax Spray 30G-M), 9.1 weight parts of C9 petroleum resin (Cleartack® W-140), 0.15 weight parts of polyether-modified siloxane-based surfactant (BYK-3450), 0.1 weight parts of silicone-based defoamer (BYK-025), 4.7 weight parts of acrylic thickener (Rheovis® AS 1125) and 101.9 weight parts of deionized water were mixed and stirred for 1 hour for evenly dispersion to prepare a water-based hot melt adhesive solution.

The obtained hot melt adhesive solution was coated on Tyvek® 2FS polyethylene spunbonded nonwoven fabric substrate by roller coating and dried at 80° C. to form a hot melt adhesive coating with a coating weight of 18.5 g/m$^2$ on Tyvek® 2FS substrate to prepare a gas-permeable hot-melt sealing film 100.

The scanning electron microscope image of the surface of the obtained gas-permeable hot-melt sealing film 100 at 400 magnifications as shown in FIG. 1. The gas permeability, surface void ratio, heat seal strength, surface roughness and layer-peeling of the obtained gas-permeable hot-melt sealing film 100 were evaluated by the evaluation methods described hereinafter. The results were shown in Table 1.

Example 5

100 weight parts of polyethylene emulsion (WPE-09838), 3.4 weight parts of water-based polyolefin ionomer aqueous dispersion (Chemipearl™ S500), 7.2 weight parts of paraffin-based wax emulsion (AQUACER 497), 8.4 weight parts of Fischer-Tropsch wax (Sasolwax Spray 30G-M), 8.4 weight parts of C9 petroleum resin (Cleartack® W-140), 0.13 weight parts of polyether-modified siloxane-based surfactant (BYK-3450), 0.09 weight parts of silicone-based defoamer (BYK-025), 5.3 weight parts of acrylic thickener (Rheovis® AS 1125) and 107.6 weight parts of deionized water were mixed and stirred for 1 hour for evenly dispersion to prepare a water-based hot melt adhesive solution.

The obtained hot-melt adhesive solution was coated on Tyvek® 2FS polyethylene spunbonded nonwoven fabric substrate by roller coating and dried at 80° C. to form a hot-melt adhesive coating with a coating weight of 17.5 g/m$^2$ on Tyvek® 2FS substrate to prepare a gas-permeable hot-melt sealing film 100.

Figure 2:
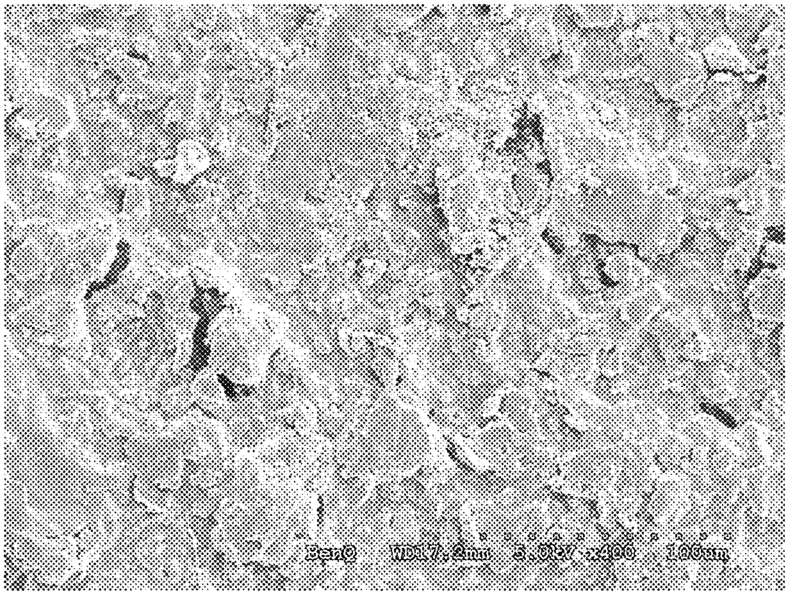
FIG. 2 is the scanning electron microscope image of the surface of the present gas-permeable hot-melt sealing film obtained from Example 5 at 400 magnifications.

The scanning electron microscope image of the surface of the obtained gas-permeable hot-melt sealing film 100 at 400 magnifications as shown in FIG. 2. The gas permeability, surface void ratio, heat seal strength, surface roughness and layer-peeling of the obtained gas-permeable hot-melt sealing film 100 were evaluated by the evaluation methods described hereinafter. The results were shown in Table 1.

Example 6

100 weight parts of polyethylene emulsion (WPE-09838), 6.0 weight parts of water-based polyolefin ionomer aqueous dispersion (Chemipearl™ S300), 4.3 weight parts of paraffin-based wax emulsion (AQUACER 497), 11.7 weight parts of Fischer-Tropsch wax (Sasolwax Spray 30G-M), 11.7 weight parts of C9 petroleum resin (Cleartack® W-140), 0.19 weight parts of polyether-modified siloxane-based surfactant (BYK-3450), 0.12 weight parts of silicone-based defoamer (BYK-025), 6.0 weight parts of acrylic thickener (Rheovis® AS 1125) and 130.4 weight parts of deionized water were mixed and stirred for 1 hour for evenly dispersion to prepare a water-based hot melt adhesive solution.

The obtained hot melt adhesive solution was coated on Tyvek® 2FS polyethylene spunbonded nonwoven fabric substrate by roller coating and dried at 80° C. to form a hot melt adhesive coating with a coating weight of 18.5 g/m$^2$ on Tyvek® 2FS substrate to prepare a gas-permeable hot-melt sealing film 100.

Figure 3:
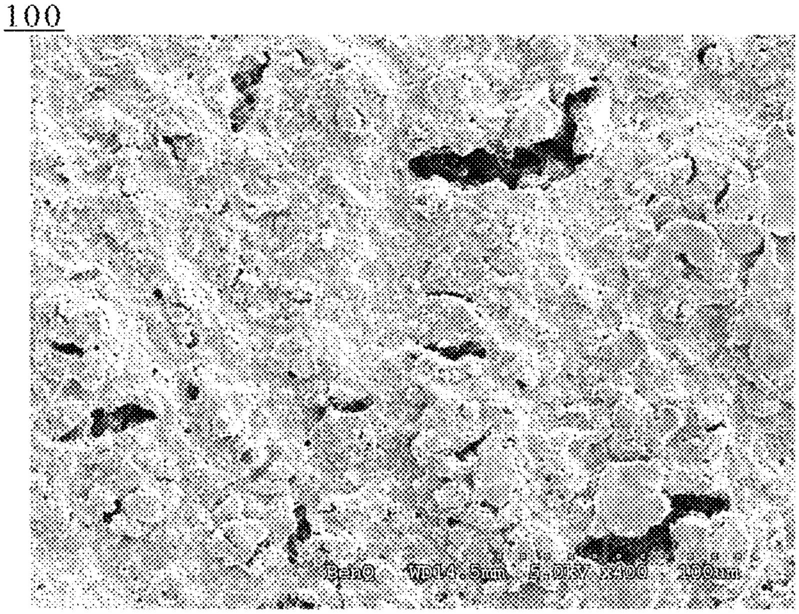
FIG. 3 is the scanning electron microscope image of the surface of the present gas-permeable hot-melt sealing film obtained from Example 6 at 400 magnifications.

The scanning electron microscope image of the surface of the obtained gas-permeable hot-melt sealing film 100 at 400 magnifications as shown in FIG. 3. The gas permeability, surface void ratio, heat seal strength, surface roughness and layer-peeling of the obtained gas-permeable hot-melt sealing film 100 were evaluated by the evaluation methods described hereinafter. The results were shown in Table 1.

Example 7

100 weight parts of polyethylene emulsion (WPE-09838), 3.1 weight parts of water-based polyolefin ionomer aqueous dispersion (Chemipearl™ S300), 4.2 weight parts of paraffin-based wax emulsion (AQUACER 497), 11.6 weight parts of Fischer-Tropsch wax (Sasolwax Spray 30G-M), 11.6 weight parts of C9 petroleum resin (Cleartack® W-140), 0.19 weight parts of polyether-modified siloxane-based surfactant (BYK-3450), 0.12 weight parts of silicone-based defoamer (BYK-025), 5.9 weight parts of acrylic thickener (Rheovis® AS 1125) and 127.8 weight parts of deionized water were mixed and stirred for 1 hour for evenly dispersion to prepare a water-based hot-melt adhesive solution.

The obtained hot-melt adhesive solution was coated on Tyvek® 2FS polyethylene spunbonded nonwoven fabric substrate by roller coating and dried at 80° C. to form a hot melt adhesive coating with a coating weight of 18.5 g/m$^2$ on Tyvek® 2FS substrate to prepare a gas-permeable hot-melt sealing film 100.

Figure 4:
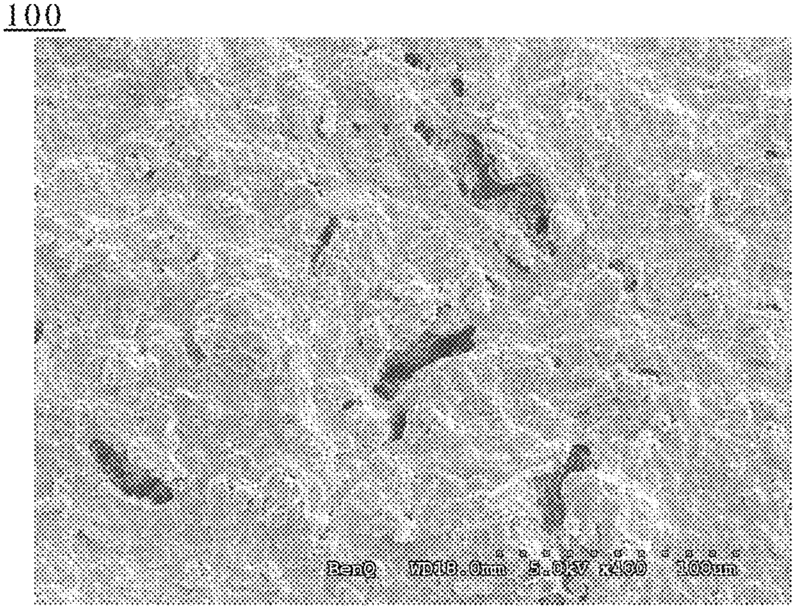
FIG. 4 is the scanning electron microscope image of the surface of the present gas-permeable hot-melt sealing film obtained from Example 7 at 400 magnifications.

The scanning electron microscope image of the surface of the obtained gas-permeable hot-melt sealing film 100 at 400 magnifications as shown in FIG. 4. The gas permeability, surface void ratio, heat seal strength, surface roughness and layer-peeling of the obtained gas-permeable hot-melt sealing film 100 were evaluated by the evaluation methods described hereinafter. The results were shown in Table 1.

Evaluation methods of gas permeability, surface void ratio, average size of the voids, coating amount, heat seal strength, surface roughness and layer-peeling.

Gas permeability: measure the average time required for 100 cubic centimeters of air to pass through the gas-permeable hot-melt sealing film according to the TAPPI T-460 standard by Gurley type Densometer Model 4980-D, manufactured by Lesson Industrial Co., Ltd, Taiwan.

Seal strength: use Heat-sealing Machine BS-25 manufactured by Dah Bah Machinery Ind. Inc. Taiwan. Set the temperature of top plate at 123° C. and the bottom plate at room temperature, the sealing pressure 1.5 Kg and press time for 1.5 seconds. Sequentially laminate transparent HDPE film and Teflon fabric on the gas-permeable hot-melt sealing film and heat press. Cut the heat sealed laminate to 15 mm width strip sample. The sample was measured the maximum value of the tensile force as the seal strength according to the description of ASTM F-88 by Tensile Strength Tester AI-3000 manufactured by Gotech Testing Machines Inc., Taiwan.

Surface void ratio (%) and average size of the voids: the gas-permeable hot-melt sealing film was cut into a proper size and adhered on a carrier stage, electroplating the sample with platinum, placing the carrier stage in the Hitachi S-4300 Cold Field Emission Scanning Electron Microscope (CFE-SEM), taking the image of sample under 60 magnifications to obtain an image with 1280×960 pixels (2133 μm in length and 1600 μm in width). The obtained image was analyzed with ImageJ (developed by the National Institutes of Health, NIH) by different shade scale of image color caused by the image depth difference to select the void area and calculate the area of the selected shade area and further to calculate the percentage of the area of the selected shade area to the overall area of the image to obtain the surface void ratio (%) and the average size (μm$^2$) of the selected voids (count).

Coating amount: according to EN ISO 536 standard test, samples were obtained by the Sample Cutter 240/100 manufactured by Hans Schmidt & Co GmbH, Germany. The samples from the water-based hot-melt adhesive coated nonwoven fabric and the uncoated high-density polyethylene spunbonded nonwoven fabric substrate were weighted, respectively. The difference between the weights of the water-based hot-melt adhesive coated nonwoven fabric and the uncoated polyethylene spunbonded nonwoven fabric substrate was the mass of coating amount per unit of area (g/m$^2$ (gsm)).

Areal surface roughness: Take 3 3D areal surface roughness images of 640×640 μm$^2$ sample by OLYMPUS LEXT OLS5000-SAF 3D laser confocal microscope with MPLAPON20× LEXT objective lens. According to ISO 25178-2:2012 the measurements of areal surface roughness, perform the measurement of root mean square height (Sq), arithmetical mean height (Sa), maximum height (Sz), root mean square slope (SAq) and developed interfacial area ratio (Sdr) 3 times and take the average of the test results.

Layer-peeling evaluation: adhere 3M 810 tape on the coating layer of the gas-permeable hot-melt sealing film and gently press back and forth by finger and then, peel the tape and observe the peeled tape if any residue of coating layer was adhered on the tape. If no coating layer residue on the tape surface, the evaluation is "excellent (○)" if there is coating layer residue on the tape surface, the evaluation is "poor (x)".

TABLE 1

The test results of Examples

| | Example 1 | Example 2 | Example 3 | Example 4 | Example 5 | Example 6 | Example 7 |
|---|---|---|---|---|---|---|---|
| Gas permeability (s/100 cc) | 93 | 54 | 95 | 45 | 60 | 66 | 61 |
| Seal strength (gf/15 mm) | 334 | 391 | 326 | 369 | 349 | 317 | 309 |
| Average size of void (μm$^2$) | 11.31 | 44.56 | 16.67 | 84.45 | 44.00 | 28.75 | 34.24 |
| Surface void ratio (%) | 0.76 | 2.88 | 1.51 | 4.19 | 3.48 | 3.16 | 4.05 |
| Coating amount (g/m$^2$) | 9.6 | 22.6 | 13.3 | 18.5 | 17.5 | 18.5 | 18.5 |
| Ratio of the Surface void ratio and the Coating amount (P/W) | 0.08 | 0.13 | 0.11 | 0.23 | 0.20 | 0.17 | 0.22 |
| Root mean square height Sq [μm] | 5.3 | 6.0 | 6.5 | 8.0 | 5.3 | 5.0 | 7.3 |
| Maximum height, Sz [μm] | 41.8 | 50.6 | 56.8 | 68.1 | 54.6 | 56.9 | 70.7 |
| Arithmetical mean height, Sa [μm] | 4.2 | 4.8 | 5.1 | 5.6 | 3.9 | 3.6 | 5.3 |
| Root mean square slope, SΔq [o] | 2.07 | 1.63 | 1.97 | 2.86 | 1.99 | 1.83 | 2.17 |
| Developed interfacial area ratio, Sdr [%] | 91.8 | 63.8 | 82.6 | 96.1 | 68.1 | 72.6 | 81.9 |
| Layer-peeling evaluation | O | O | O | O | O | O | O |

From Table 1, the gas-permeable hot-melt sealing films prepared from examples 1 to 7 provided satisfied gas permeability and seal strength after heat sealing with HDPE film. FIG. 1 to FIG. 4 are shown the scanning electron microscope image of the surfaces of the gas-permeable hot-melt sealing films 100 obtained from Example 4 to Example 7 at 400 magnifications.

Although particular embodiments have been shown and described, it should be understood that the above discussion is not intended to limit the present disclosure to these embodiments. Persons skilled in the art will understand that various changes and modifications may be made without departing from the scope of the present disclosure as literally and equivalently covered by the following claims.

What is claimed is:

1. A gas-permeable hot-melt sealing film, comprising:
- a polyolefin spunbonded nonwoven fabric substrate; and
- a water-based hot-melt adhesive coating layer coated on the substrate and comprising a plurality of voids;
- wherein a coating amount of the water-based hot-melt adhesive coating layer is between 6 $g/m^2$ and 35 $g/m^2$ and a surface void ratio is between 0.5% and 6.0%,
- wherein the water-based hot-melt adhesive coating layer comprises 40 wt % to 75 wt % of a water-based adhesive resin, 15 wt % to 35 wt % of wax particles and 15 wt % to 35 wt % of tackifier particles, wherein the total amount of the wax particles and the tackifier particles is 30 wt % to 60 wt % of the total weight of the water-based hot-melt adhesive coating layer,
- wherein the wax particles, and the tackifier particles each in the form of discrete particles have a particle size ranging from 3 μm to 35 μm in the water-based hot-melt adhesive coating.

2. The gas-permeable hot-melt sealing film as claimed in claim 1, wherein a gas permeability of the gas-permeable hot-melt sealing film is less than 120 second/100 cc and the seal strength thereof is more than 220 g/15mm.

3. The gas-permeable hot-melt sealing film as claimed in claim 1, wherein an average surface area size of the plurality of voids on the water-based hot-melt adhesive coating layer is between 2 $\mu m^2$ and 150 $\mu m^2$.

4. The gas-permeable hot-melt sealing film as claimed in claim 1, wherein a ratio of the surface void ratio and the coating amount of the water-based hot-melt adhesive coating layer is between 0.03 and 0.50.

5. The gas-permeable hot-melt sealing film as claimed in claim 1, wherein a surface roughness of the water-based hot-melt adhesive coating layer has a root mean square height (Sq) from 3.0 μm to 11 μm, a maximum height (Sz) from 30 μm to 100 μm, an arithmetical mean height (Sa) from 2.5 μm to 6.5 μm, a root mean square slope (Sqq) from 1.00 to 3.80 and a developed interfacial area ratio (Sdr) from 30% to 110%.

6. The gas-permeable hot-melt sealing film as claimed in claim 1, wherein a weight ratio of the wax particles and the tackifier particles in the water-based hot-melt adhesive coating layer is between 0.6:1 and 1.5:1.

7. The gas-permeable hot-melt sealing film as claimed in claim 1, wherein the water-based adhesive resin comprises one or more water-based polyolefin resins selected from the group consisting of water-based polyethylene resin, water-based polypropylene resin, water-based polybutylene resin, water-based oxidized polyethylene resin and water-based ethylene-(meth) acrylic acid copolymer, and the combinations thereof.

8. The gas-permeable hot-melt sealing film as claimed in claim 1, wherein the water-based adhesive resin further comprises a water-based ionomer selected from the group consisting of water-based polyethylene ionomer, water-based polypropylene ionomer, water-based polybutylene ionomer, and water-based oxidized polyethylene ionomer, and the combinations thereof.

9. The gas-permeable hot-melt sealing film as claimed in claim 8, wherein the water-based ionomer is present in an amount of 2 wt % to 20 wt % based on the total weight of the water-based adhesive resin.

10. The gas-permeable hot-melt sealing film as claimed in claim 1, wherein the water-based hot-melt adhesive coating layer further comprises 1 wt % to 10 wt % of water-based paraffin.

11. A healthcare packaging comprising the gas-permeable hot-melt sealing film as claimed in claim 1 sealed with a polymer sheet or a polymer blister container.

12. The healthcare packaging as claimed in claim 11, wherein the polymer sheet or the polymer blister container is made of PET (polyethylene terephthalate), PETG (polyethylene terephthalateco-1,4-cylclohexylenedimethylene terephthalate), PVC (polyvinyl chloride), APET (amorphous polyethylene terephthalate), PS (polystyrene), PP (polypropylene), PC (polycarbonate), PE (polyethylene) or nylon.

13. The healthcare packaging as claimed in claim 11, wherein a heat seal strength of the gas-permeable hot-melt sealing film with the polymer sheet or the polymer blister container is between 250 g/15 mm and 450 g/15 mm.

* * * * *